(12) United States Patent
Suh et al.

(10) Patent No.: US 8,691,117 B2
(45) Date of Patent: Apr. 8, 2014

(54) ORGANIC SOLVENT DISPERSIBLE CONDUCTIVE POLYMER AND METHOD FOR MANUFACTURE THEREOF

(75) Inventors: Kwang Suck Suh, Seongnam-si (KR); Jong Eun Kim, Seoul (KR); Tae Young Kim, Seoul (KR); Tae Hee Lee, Seongnami-si (KR); Won Jung Kim, Seoul (KR)

(73) Assignee: Kwang Suck Suh (KR)

( * ) Notice: Subject to any disclaimer, the term of this patent is extended or adjusted under 35 U.S.C. 154(b) by 230 days.

(21) Appl. No.: 13/003,747

(22) PCT Filed: Jul. 11, 2009

(86) PCT No.: PCT/KR2009/003812
§ 371 (c)(1), (2), (4) Date: Mar. 24, 2011

(87) PCT Pub. No.: WO2010/005271
PCT Pub. Date: Jan. 14, 2010

(65) Prior Publication Data
US 2011/0175034 A1    Jul. 21, 2011

(30) Foreign Application Priority Data
Jul. 11, 2008 (KR) .......................... 10-2008-0067836

(51) Int. Cl.
*H01B 1/00* (2006.01)
*C08G 75/00* (2006.01)
*C08G 73/00* (2006.01)
*C08G 73/06* (2006.01)

(52) U.S. Cl.
USPC ............ 252/500; 528/373; 528/422; 528/423

(58) Field of Classification Search
USPC ................ 252/500–521.6; 528/373, 422, 423
See application file for complete search history.

(56) References Cited

U.S. PATENT DOCUMENTS

| 6,235,220 B1 * | 5/2001 | Pron et al. ...................... 252/500 |
| 7,034,104 B2 | 4/2006 | Baik et al. |
| 2006/0047030 A1 * | 3/2006 | Yoshida et al. ................. 524/99 |
| 2009/0121194 A1 * | 5/2009 | Watanabe ...................... 252/500 |

FOREIGN PATENT DOCUMENTS

| CN | 1829828 | 9/2006 |
| KR | 10-2004-0073183 A | 8/2004 |
| KR | 10-0779255 B1 | 11/2007 |
| WO | WO 2007-013787 A1 | 2/2007 |
| WO | WO 2007145185 A1 * | 12/2007 ............. C08L 65/00 |

* cited by examiner

*Primary Examiner* — Mark Kopec
*Assistant Examiner* — Jaison Thomas
(74) *Attorney, Agent, or Firm* — John K. Park; Park Law Firm

(57) ABSTRACT

Disclosed is a conductive polymer which is easily dispersed in an organic solvent. A method of preparing the conductive polymer adapted to be dispersed in an organic solvent is also provided, which includes chemically polymerizing a monomer using as a dopant anion a phosphate-based compound having solubility in an organic solvent. The conductive polymer capable of being dispersed in various organic solvents can be obtained through a simple preparation process, and thus can be utilized in the fields of applied materials in which the use of conventional water-dispersible conductive polymers is limited.

14 Claims, No Drawings

ORGANIC SOLVENT DISPERSIBLE CONDUCTIVE POLYMER AND METHOD FOR MANUFACTURE THEREOF

TECHNICAL FIELD

The present invention relates to a method of preparing a conductive polymer which is dispersed in various organic solvents, and particularly to a method of preparing a conductive polymer which is easily dispersed in an organic solvent and has high electrical conductivity, by synthesizing a conductive polymer using a dopant having high solubility in an organic solvent.

BACKGROUND ART

Intrinsically conductive polymers including polyaniline, polypyrrole, polythiophene and derivatives thereof exhibit variable electrical conductivity as a result of being doped by a doping process, unlike conventional electrical insulating polymers. Hence, many attempts have been made to apply such conductive polymers to fields including antistatic materials, film materials for capacitors, electrochromic devices or displays, and so on.

However, conductive polymers are insoluble in a solvent attributable to strong intermolecular attractions and effects of dopant anions, undesirably resulting in poor processability. Even in the case of poly(3,4-ethylenedioxythiophene)/polystyrene acid (Clevios P, purchased from H. C. Starck GmbH, Germany) which overcomes the above problem and is currently commercially available, it is provided in the form of being dispersed only in water, and thus the application thereof is limited to specific fields.

In order to solve such problems, different methods have been devised.

For example, U.S. Patent Application No. 2003/0088032 A1 discloses a method of preparing a conductive polymer which is dispersible in an organic solvent such as nitromethane, propylenecarbonate or the like by copolymerizing a heteroaromatic conductive polymer block with an ethyleneoxide block for imparting solubility in an organic solvent or by end-capping a conductive polymer oligomer with a methacrylate or another acrylate group.

This method, which changes a bond system itself of the conductive polymer chain to impart dispersibility in an organic solvent, is problematic in that synthesis and polymerization procedures are multi-staged thus making it difficult to prepare the conductive polymer and to control the properties thereof, and also that the synthesized conductive polymer has poor electrical conductivity.

Furthermore, there was reported a method of synthesizing a conductive polymer compound in which a stereostructure stabilizer such as polyvinylalcohol, polyvinylacetate or cellulose derivative is used so that the resultant polymer compound particles have a small size thus facilitating the dispersion of the polymer compound in the solution (Polymer, vol. 33, pp. 4857, 1992). However, this method suffers because polyvinylalcohol is used only as the dispersion stabilizer and does not function as a dopant, and thus acts as an impurity when a final electrical conductive film is formed, undesirably reducing electrical conductivity.

DISCLOSURE

Technical Problem

Accordingly, the present invention has been made keeping in mind the above problems encountered in the related art, and the present invention intends to provide a conductive polymer and a method of preparing the same, in which a dopant compound having solubility in various organic solvents is used, thus producing a conductive polymer which is easily dispersed in an organic solvent and has high electrical conductivity. The technical problem which is intended to be achieved in the present invention is not limited thereto, and the other technical problems which are not mentioned should also be clearly understandable by those skilled in the art from the following description.

Technical Solution

An aspect of the present invention provides an organic solvent-dispersible conductive polymer, which is polymerized from a conductive polymer monomer represented by Formula 1 below using as a dopant an organic solvent-soluble phosphate-based compound represented by Formula 2 below.

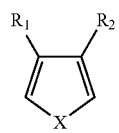

Formula 1

In Formula 1, $R_1$ and $R_2$ together form alkylene, alkenylene, alkenyloxy, alkenyldioxy, alkynyloxy or alkynyldioxy of a 3- to 8-membered alicyclic or aromatic ring, or each are hydrogen, halogen, $C_{1\sim15}$ alkyl, alkoxy, carbonyl or a hydroxyl group, and X which is a hetero atom is selected from the group consisting of sulfur (S), oxygen (O), selenium (Se) and NH.

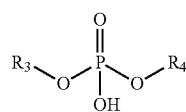

Formula 2

In Formula 2, $R_3$ and $R_4$ each are any one selected from the group consisting of $C_{1\sim20}$ alkyl, isoalkyl, alkoxy, alkoxyalkyl, alkylsulfonyl, alkoxysulfonyl, alkylsilane and alkoxysilane.

Another aspect of the present invention provides a method of preparing a conductive polymer composite including mixing the above conductive polymer with various binders for imparting different functionalities.

Advantageous Effects

According to the present invention, an organic solvent-dispersible conductive polymer is synthesized using as a dopant a phosphate-based compound which is highly soluble in an organic solvent, thus exhibiting high dispersibility in various organic solvents and also superior electrical conductivity. In addition, a method of preparing the conductive polymer according to the present invention is advantageous because its preparation process is simple while enabling the conductive polymer to have high electrical conductivity and dispersibility in an organic solvent.

BEST MODE

Hereinafter, a detailed description will be given of the present invention.

The present invention provides an organic solvent-dispersible conductive polymer represented by Formula 3 below and a method of preparing the same including chemically polymerizing a monomer represented by Formula 1 below using as a dopant anion a phosphate-based compound represented by Formula 2 below.

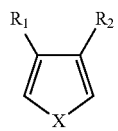

Formula 1

In Formula 1, $R_1$ and $R_2$ together form alkylene, alkenylene, alkenyloxy, alkenyldioxy, alkynyloxy or alkynyldioxy of a 3- to 8-membered alicyclic or aromatic ring, or each are hydrogen, halogen, $C_{1~15}$ alkyl, alkoxy, carbonyl or a hydroxyl group. X which is a hetero atom is selected from the group consisting of sulfur (S), oxygen (O), selenium (Se) and NH.

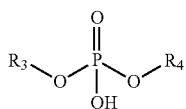

Formula 2

In Formula 2, $R_3$ and $R_4$ each are any one selected from the group consisting of $C_{1~20}$ alkyl, isoalkyl, alkoxy, alkoxyalkyl, alkylsulfonyl, alkoxysulfonyl, alkylsilane and alkoxysilane.

Also, the present invention provides a conductive polymer composite obtained by mixing the conductive polymer represented by Formula 3 below with various binders for imparting different functionalities.

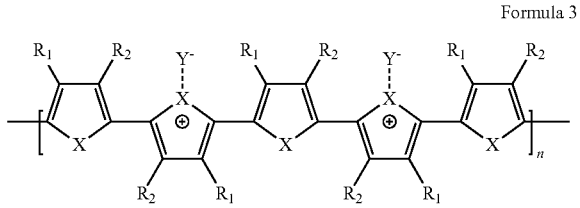

Formula 3

In Formula 3, Y is an anion of a dopant including the phosphate-based compound represented by Formula 2.

According to the present invention, the method of preparing the organic solvent-dispersible conductive polymer includes adding the monomer of Formula 1 and the phosphate-based compound of Formula 2 to an aqueous or non-aqueous synthesis solvent thus obtaining a mixed solution, and adding a solution of an oxidant in water to the mixed solution to thus initiate a polymerization reaction, thereby preparing a conductive polymer solution. Furthermore, after completion of the polymerization reaction, instead of depositing the conductive polymer material to a particle phase and then re-dissolving it in a solvent, the organic layer is separated and treatment thereof to remove unreacted material and impurities is performed. Thereby, after the polymerization reaction, the conductive polymer dispersion solution in which the conductive polymer is dispersed in the solvent may be directly obtained.

Preferable examples of the monomer represented by Formula 1 include aniline, pyrrole and salts or derivatives thereof, 3-methylthiophene, 3-hexylthiophene, 3-octylthiophene, 3-methoxythiophene, dimethoxythiophene, diethoxythiophene, dipropoxythiophene, dibutoxythiophene, methylenedioxythiophene, ethylenedioxythiophene, propylenedioxythiophene, and butylenedioxythiophene.

A preferable example of the compound represented by Formula 2 may include bis(2-ethylhexyl)phosphate acid or its salt having a phosphate group as a polar functional group and a 2-ethylhexyl group as a non-polar functional group. As such, the phosphate group functions as a dopant anion of the conductive polymer, and the 2-ethylhexyl group is effective in enabling dispersion in various organic solvents. When bis(2-ethylhexyl)phosphate acid, the 2-ethylhexyl group of which is hydrophobic and the phosphate acid of which is hydrophilic, is dissolved in a solvent mixture of hydrophilic and hydrophobic solvents, a micelle structure is formed, and thus the conductive polymer may be prepared through emulsion polymerization. Accordingly, the resultant organic solvent-dispersible conductive polymer can exhibit high dispersibility in various organic solvents thanks to the use of the above compound.

Further, the compound of Formula 2 may be used in combination with an additional dopant. As such, the compound of Formula 2 functions to increase dispersibility in an organic solvent and the additional dopant plays a role in increasing electrical conductivity of the resultant conductive polymer, whereby the conductive polymer may be provided in a more preferable form. Examples of the additional dopant which may be used together with the compound of Formula 2 may include but are not necessarily limited to aromatic sulfonic acid including benzene sulfonic acid, toluene sulfonic acid, 2-naphthalene sulfonic acid, 2,6-naphthalene disulfonic acid, anthraquinone sulfonic acid and anthraquinone disulfonic acid, and (di)alkylsulfate including methylsulfate, dimethylsulfate, ethylsulfate and diethylsulfate.

The dopant may be used in an amount of 0.1~100 mol and preferably 1~10 mol based on 1 mol of the conductive polymer monomer. Also, the mixing ratio of bis(phosphate)-based dopant and additional dopant may be set to 100:0~10:90 by weight.

The solvent used in the polymerization of the monomer may include water or a solvent mixture of water and an organic solvent. In the case where the solvent mixture of water and organic solvent is used, the organic solvent may be one or more selected from the group consisting of an alcohol solvent including methanol, ethanol, propanol, isopropanol, butanol and isobutanol, an ether solvent including diethylether, dipropylether, dibutylether, butylethylether and tetrahydrofuran, an alcohol ether solvent including ethyleneglycol, propyleneglycol, ethyleneglycol monomethylether, ethyleneglycol monoethylether and ethyleneglycol monobutylether, a ketone solvent including acetone, methylethylketone, methylisobutylketone and cyclohexanone, an amide solvent including N-methyl-2-pyrrolidinone, 2-pyrrolidinone, N-methylformamide and N,N-dimethylformamide, a sulfoxide solvent including dimethylsulfoxide and diethylsulfoxide, a sulfone solvent including diethylsulfone and tetramethylene sulfone, a nitrile solvent including acetonitrile and benzonitrile, an amine solvent including alkylamine, cyclic amine and aromatic amine, an ester solvent including methyl butyrate, ethyl butyrate and propyl propionate, a carboxylic acid ester solvent including ethyl acetate and butyl acetate, an aromatic hydrocarbon solvent including benzene, ethylbenzene, chlorobenzene, toluene and xylene, an aliphatic hydrocarbon solvent including hexane, heptane and cyclohexane, a halogenated hydrocarbon solvent including chloroform, tetrachloroethylene, carbon tetrachloride, dichloromethane and dichloroethane, propylene carbonate, ethylene carbonate, dimethyl carbonate, dibutyl carbonate, ethylmethyl carbonate, nitromethane, and nitrobenzene.

The mixing ratio of water and organic solvent in the solvent mixture used as the synthesis solvent may be set to 100:0~10:90 by weight.

The monomer of Formula 1 and the phosphate-based compound of Formula 2 are added to the aqueous or non-aqueous synthesis solvent thus obtaining the mixed solution, to which the solution of oxidant in water is then added, thus initiating a polymerization reaction for obtaining a conductive polymer. When the polymerization reaction is performed using a stirrer at high rate (200~3000 rpm), the particle size of the synthesized conductive polymer is reduced, thus more effectively increasing the conductivity.

The oxidant usable in the present invention may be used without limitation as long as it typically induces a polymerization reaction of conductive polymer, and specific examples thereof may include iron(III) salts including $FeCl_3$, $Fe(ClO_4)_3$, $Fe_2(SO_4)_3$ and $Fe_2(S_2O_8)_3$, iron(III)-inorganic acid salts, iron(III)-organic acid salts including iron(III)-toluenesulfonate and iron(III)-camphorsulfonate, persulfates including ammonium persulfate ($(NH_4)_2S_2O_8$), sodium persulfate ($Na_2S_2O_8$) and potassium persulfate ($K_2S_2O_8$), alkali perborate, potassium permanganate, potassium dichromate, copper salts, and hydrogen peroxide.

After the completion of the polymerization reaction, the reaction solution is allowed to stand for a predetermined period of time, thus separating the organic layer containing conductive polymer from the water layer. Then, the organic layer containing conductive polymer is recovered. Because the organic layer containing conductive polymer still includes impurities and unreacted material, it is washed several times with a washing solvent and purified.

The washing solvent is selected from the group consisting of water, methylalcohol, 2-butylalcohol, ethyleneglycol, diethyleneglycol, ethylcellosolve, butylcellosolve, ethylcarbitol, butylcarbitol, acetone and mixtures thereof.

The conductive polymer thus obtained exhibits electrical conductivity ranging from $10^{-5}$ S/cm to 100 S/cm depending on the types of oxidant and additional dopant used in the polymerization procedure, and is efficiently dispersed in an organic solvent such as n-butanol, dimethylsulfoxide, N-methylpyrrolidinone, dimethylformamide, propylene carbonate and nitromethane due to the use of bis(2-ethylhexyl)phosphate acid and additional dopant.

The conductive polymer according to the present invention has poor dispersibility in a non-polar solvent such as ethyl acetate, toluene or xylene. However, when the conductive polymer is dispersed in n-butanol and is then mixed with a non-polar solvent, mixing thereof with the non-polar solvent is possible without particle aggregation.

Because the conductive polymer dispersed in the organic solvent is efficiently compatible with various organic or inorganic binders having solubility in an organic solvent, it may be used as an antistatic coating solution obtained by mixing the binder with the conductive polymer in the organic solvent. As such, the binder is used to control adhesivity, moldability, scratch resistance and durability of a final coating film, and sheet resistance of the coating film may be variously adjusted depending on the content ratio of conductive polymer and binder. Examples of the binder mixed with the conductive polymer may include but are not limited to an organic binder including a urethane group, an epoxy group, a carboxyl group, a carbonyl group, an acrylic group, a hydroxyl group, an ester group, an ether group, an amide group, an imide group, a maleic acid group and a vinylacetate group, and an inorganic binder including an inorganic component including silicate and titanate. In addition, one or more selected from among organic or inorganic binders typically used in the art may be used. As such, the binder may be used in an amount 0.1~100 times the weight of the conductive polymer.

If the binder is used in an amount exceeding 100 times the amount of conductive polymer, sheet resistance of the resultant coating film is increased thus making it difficult to satisfy a required standard value. In contrast, if the binder is used in an amount less than 0.1 times the amount of conductive polymer, it is difficult to achieve an improvement in coating properties expected from the addition of the binder.

In the method of dispersing the conductive polymer in the organic solvent using the phosphate acid compound as the dopant anion of the conductive polymer as mentioned above, the types of conductive polymer, dopant and synthesis solvent are appropriately selected, thus obtaining the conductive polymer having high dispersibility in an organic solvent and high electrical conductivity, which may then be utilized in various application fields.

MODE FOR INVENTION

A better understanding of the present invention regarding the organic solvent-dispersible conductive polymer and the method of preparing the same may be obtained in light of the following examples which are set forth to illustrate, but are not to be construed to limit the present invention.

Example 1

In a round-bottom flask containing 90 ml of distilled water, 1.4 g of a 3,4-ethylenedioxythiophene (EDOT) monomer and 3.2 g of bis(2-ethylhexyl)phosphate were mixed and stirred. Separately, 2.3 g of ammonium persulfate (APS) was dissolved in 10 ml of distilled water, thus obtaining an aqueous APS solution. The aqueous APS solution was then slowly added to the mixture of EDOT monomer and bis(2-ethylhexyl)phosphate, so that a polymerization reaction was initiated. The reaction solution was stirred at 0° C. for 72 hours, and the polymerization reaction was then completed, after which the resultant precipitate was separated and recovered. The precipitate was washed three times with water and alcohol to remove impurities, and then dried in a vacuum under conditions of 60° C. and 24 hours. The obtained product was dissolved to 5 wt % in dimethylsulfoxide serving as a polar organic solvent and then cast, thus forming a film. The electrical conductivity of the film thus formed was determined to be $4.0 \times 10^{-1}$ S/cm depending on the type of solvent used.

Example 2

In a round-bottom flask containing 110 ml of distilled water, 2.1 g of a pyrrole monomer and 3.5 g of bis(2-ethylhexyl)phosphate were mixed and stirred. Separately, 1.3 g of iron tetrachloride ($FeCl_4$) was dissolved in 10 ml of distilled water, thus obtaining an aqueous $FeCl_4$ solution. The aqueous $FeCl_4$ solution was then slowly added to the mixture of pyrrole monomer and bis(2-ethylhexyl)phosphate, so that a polymerization reaction was initiated. The reaction solution was stirred at 0° C. for 3 hours at a high rate, and the polymerization reaction was then completed, after which the resultant precipitate was separated and recovered. The precipitate was washed three times with water and alcohol to remove impurities, and then dried in a vacuum under conditions of 60° C. and 24 hours. The obtained product was dissolved to 3 wt % in N-methylpyrrolidinone serving as a polar organic solvent and then cast, thus forming a film. The electrical conductivity (four-probe method, Keithley 2400) of the film thus formed was determined to be 1.4 S/cm depending on the type of solvent used.

Example 3

A polymerization reaction was performed in the same manner as in Example 1, with the exception that the polymerization reaction was initiated using as the synthesis solvent a solvent mixture of 60 ml of distilled water and 40 ml of n-butanol instead of 100 ml of distilled water. After the completion of the polymerization reaction, the reaction solution was allowed to stand in a separatory funnel for 3 hours, thus separating the organic layer containing poly(3,4-ethylenedioxythiophene) (PEDOT) from the water layer. The separated organic layer was washed alternately three times with water and alcohol, thus removing unreacted material and impurities. The washed organic layer was completely dewatered using $MgSO_4$, after which the PEDOT thus obtained was diluted with ethyl acetate, applied on a PET film using a No. 16 bar coater and then dried at 80° C. for 2 min, thus forming a film. The sheet resistance of the film thus formed was measured to be $10^6$ ohms/sq.

Example 4

Added to a solvent mixture of 70 ml of distilled water and 30 ml of n-butanol was a mixture of 1.4 g of a 3,4-ethylenedioxythiophene (EDOT) monomer and a dopant combination composed of 2.7 g of bis(2-ethylhexyl)phosphate and 0.8 g of diethylsulfate. Separately, 2.3 g of ammonium persulfate (APS) was dissolved in 10 ml of distilled water, thus obtaining an aqueous APS solution. Subsequently, the aqueous APS solution was slowly added to the mixture of EDOT monomer, bis(2-ethylhexyl)phosphate and diethylsulfate, so that a polymerization reaction was initiated. The reaction solution was stirred at 0° C. for 72 hours, and the polymerization reaction was then completed. The reaction solution was allowed to stand in a separatory funnel for 3 hours, thus separating the organic layer containing poly(3,4-ethylenedioxythiophene) (PEDOT) from the water layer. The separated organic layer was washed alternately three times with water and alcohol, thus removing unreacted material and impurities. The washed organic layer was completely dewatered using $MgSO_4$, after which the PEDOT thus obtained was diluted with ethyl acetate, applied on a PET film using a No. 16 bar coater and then dried at 80° C. for 2 min, thus forming a film. The sheet resistance of the film thus formed was measured to be $10^5$ ohms/sq.

Example 5

The organic solvent-dispersible conductive polymer dispersion solution prepared in Example 4 was mixed with an acrylic binder having solubility in an organic solvent, thus obtaining an antistatic coating solution. As such, the organic solvent-dispersible conductive polymer was dispersed in a solvent mixture of n-butanol/ethylacetate (volume ratio: 10/90) so that the solid content thereof was 5%, and used as the acrylic binder was photopolymerizable bisphenol A-ethyleneglycol diacrylate. The antistatic coating solution was prepared by mixing 40 parts by weight of the conductive polymer, 30 parts by weight of bisphenol A-ethyleneglycol diacrylate, 2 parts by weight of a photoinitiator for example 1-hydroxy cyclohexylphenylketone, 0.5 parts by weight of a light stabilizer for example Disperbyk-106 (available from BYK) and 27.5 parts by weight of ethyl acetate. The antistatic coating solution thus prepared was applied on a PET film using a No. 16 bar coater, dried at 80° C. for 2 min and then exposed to UV light of 300 mJ/cm³ using a UV lamp and thus cured. The resultant film had sheet resistance measured to be $10^9$ ohms/sq, and was subjected to a pencil hardness test using which the surface hardness thereof was measured to be 2H, which was evaluated to be increased.

INDUSTRIAL APPLICABILITY

According to the present invention, the organic solvent-dispersible conductive polymer can be utilized in various antistatic fields including antistatic coating agents and so on, or in various fields including film materials for capacitors, electrochromic devices or displays and so on.

The invention claimed is:

1. A method of preparing an organic solvent-dispersible conductive polymer adapted to be easily dispersed in an organic solvent, comprising chemically polymerizing a monomer represented by Formula 1 below using a solution of an oxidant in a solvent in presence of a phosphate-based compound represented by Formula 2 below as a dopant:

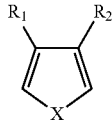

Formula 1 wherein $R_1$ and $R_2$ together form alkylene, alkenylene, alkenyloxy, alkenyldioxy, alkynyloxy or alkynyldioxy of a 3- to 8-membered alicyclic or aromatic ring, or each are hydrogen, halogen, $C_{1\sim15}$ alkyl, alkoxy, carbonyl or a hydroxyl group, and X which is a hetero atom is selected from the group consisting of sulfur (S), oxygen (O), selenium (Se) and NH; and

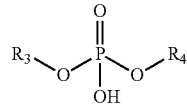

Formula 2 wherein $R_3$ and $R_4$ each are any one selected from the group consisting of $C_{1\sim20}$ alkyl, isoalkyl, alkoxy, alkoxyalkyl, alkylsulfonyl, alkoxysulfonyl, alkylsilane and alkoxysilane.

2. The method according to claim 1, wherein the dopant is used in an amount of 0.1~100 mol based on 1 mol of the monomer.

3. The method according to claim 2, wherein the phosphate-based compound represented by Formula 2 is used in combination with an additional dopant comprising an aromatic sulfonic acid (or its salt) or an alkyl sulfate having a $C_{1\sim10}$ alkyl group.

4. The method according to claim 3, wherein the aromatic sulfonic acid (or its salt) comprises aromatic sulfonic acid including benzene sulfonic acid, toluene sulfonic acid, 2-naphthalene sulfonic acid, 2,6-naphthalene disulfonic acid, anthraquinone sulfonic acid and anthraquinone disulfonic acid, or the alkyl sulfate comprises (di)alkylsulfate including methylsulfate, dimethylsulfate, ethylsulfate and diethylsulfate.

5. The method according to claim 1, wherein the phosphate-based compound represented by Formula 2 is used in combination with an additional dopant comprising an aromatic sulfonic acid (or its salt) or an alkyl sulfate having a $C_{1\sim10}$ alkyl group.

6. The method according to claim 5, wherein the aromatic sulfonic acid (or its salt) comprises aromatic sulfonic acid including benzene sulfonic acid, toluene sulfonic acid, 2-naphthalene sulfonic acid, 2,6-naphthalene disulfonic acid, anthraquinone sulfonic acid and anthraquinone disulfonic acid, or the alkyl sulfate comprises (di)alkylsulfate including methylsulfate, dimethylsulfate, ethylsulfate and diethylsulfate.

7. The method according to claim 5, wherein the oxidant is selected from the group consisting of iron(III) salts including $FeCl_3$, $Fe(ClO_4)_3$, $Fe_2(SO_4)_3$ and $Fe_2(S_2O_8)_3$, iron (III)-inorganic acid salts, iron(III)-organic acid salts including iron (III)-toluenesulfonate and iron(III)-camphorsulfonate, persulfates including ammonium persulfate (($NH_4)_2S_2O_8$). sodium persulfate ($Na_2S_2O_8$) and potassium persulfate ($K_2S_2O_8$), alkali perborate, potassium permanganate, potassium dichromate, copper salts, and hydrogen peroxide.

8. The method according to claim 5, wherein the solvent is water, an organic solvent, or a solvent mixture of water and an organic solvent.

9. The method according to claim 5, wherein
the monomer represented by Formula 1 is any one selected from the group consisting of aniline, pyrrole and salts or derivatives thereof, 3-methylthiophene, 3-hexylthiophene, 3-octylthiophene, 3-methoxythiophene, dimethoxythiophene, diethoxythiophene, dipropoxythiophene, dibutoxythiophene, methylenedioxythiophene, ethylenedioxythiophene, propylenedioxythiophene and butylenedioxythiophene, or
the compound represented by Formula 2 is a bis(2-ethylhexyl)phosphate acid or its salt having a phosphate group as a polar functional group and a 2-ethylhexyl group as a non-polar functional group.

10. The method according to claim 1, wherein the oxidant is selected from the group consisting of iron(III) salts including $FeCl_3$, $Fe(ClO_4)_3$, $Fe_2(SO_4)_3$ and $Fe_2(S_2O_8)_3$, iron(III)-inorganic acid salts, iron(III)-organic acid salts including iron (III)-toluenesulfonate and iron(III)-camphorsulfonate, persulfates including ammonium persulfate (($NH_4)_2S_2O_8$). sodium persulfate ($Na_2S_2O_8$) and potassium persulfate ($K_2S_2O_8$), alkali perborate, potassium permanganate, potassium dichromate, copper salts, and hydrogen peroxide.

11. The method according to claim 1, wherein the solvent is water, an organic solvent, or a solvent mixture of water and an organic solvent.

12. The method according to claim 11, wherein the organic solvent is one or more selected from the group consisting of an alcohol solvent including methanol, ethanol, propanol, isopropanol, butanol and isobutanol; an ether solvent including diethylether, dipropylether, dibutylether, butylethylether and tetrahydrofuran; an alcohol ether solvent including ethyleneglycol, propyleneglycol, ethyleneglycol monomethylether, ethyleneglycol monoethylether and ethyleneglycol monobutylether; a ketone solvent including acetone, methylethylketone, methylisobutylketone and cyclohexanone; an amide solvent including N-methyl-2-pyrrolidinone, 2-pyrrolidinone, N-methylformamide and N,N-dimethylformamide; a sulfoxide solvent including dimethylsulfoxide and diethylsulfoxide; a sulfone solvent including diethylsulfone and tetramethylene sulfone; a nitrile solvent including acetonitrile and benzonitrile; an amine solvent including alkylamine, cyclic amine and aromatic amine; an ester solvent including methyl butyrate, ethyl butyrate and propyl propionate; a carboxylic acid ester solvent including ethyl acetate and butyl acetate; an aromatic hydrocarbon solvent including benzene, ethylbenzene, chlorobenzene, toluene and xylene; an aliphatic hydrocarbon solvent including hexane, heptane and cyclohexane; a halogenated hydrocarbon solvent including chloroform, tetrachloroethylene, carbon tetrachloride, dichloromethane and dichloroethane; propylene carbonate; ethylene carbonate; dimethyl carbonate; dibutyl carbonate; ethylmethyl carbonate; nitromethane; and nitrobenzene.

13. The method according to claim 11, wherein a mixing ratio of water and organic solvent in the solvent mixture is set to 100:0~10:90 by weight.

14. The method according to claim 1, wherein
the monomer represented by Formula 1 is any one selected from the group consisting of aniline, pyrrole and salts or derivatives thereof, 3-methylthiophene, 3-hexylthiophene, 3-octylthiophene, 3-methoxythiophene, dimethoxythiophene, diethoxythiophene, dipropoxythiophene, dibutoxythiophene, methylenedioxythiophene, ethylenedioxythiophene, propylenedioxythiophene and butylenedioxythiophene, or
the compound represented by Formula 2 is a bis(2-ethylhexyl)phosphate acid or its salt having a phosphate group as a polar functional group and a 2-ethylhexyl group as a non-polar functional group.

* * * * *